US008751561B2

(12) United States Patent
    Wideman

(10) Patent No.: US 8,751,561 B2
(45) Date of Patent: Jun. 10, 2014

(54) METHODS AND SYSTEMS FOR IMPROVED THROUGHPUT PERFORMANCE IN A DISTRIBUTED DATA DE-DUPLICATION ENVIRONMENT

(76) Inventor: Roderick B. Wideman, Shakopee, MN (US)

( * ) Notice: Subject to any disclaimer, the term of this patent is extended or adjusted under 35 U.S.C. 154(b) by 383 days.

(21) Appl. No.: 12/099,698

(22) Filed: Apr. 8, 2008

(65) Prior Publication Data

US 2009/0254609 A1    Oct. 8, 2009

(51) Int. Cl.
    *G06F 15/16* (2006.01)
(52) U.S. Cl.
    USPC .................................... 709/203; 707/999.204
(58) Field of Classification Search
    USPC .................................... 709/203; 707/999.204
    See application file for complete search history.

(56) References Cited

U.S. PATENT DOCUMENTS

| 5,990,810 | A * | 11/1999 | Williams ........................ 341/51 |
| 6,374,266 | B1 * | 4/2002 | Shnelvar .............................. 1/1 |
| 2002/0174180 | A1 | 11/2002 | Brown et al. |
| 2003/0046335 | A1 * | 3/2003 | Doyle et al. ................... 709/203 |
| 2003/0105716 | A1 * | 6/2003 | Sutton et al. .................... 705/50 |
| 2004/0143713 | A1 * | 7/2004 | Niles et al. ..................... 711/162 |
| 2004/0236803 | A1 * | 11/2004 | Spiegeleer .................... 707/204 |
| 2006/0069719 | A1 | 3/2006 | McCanne et al. |
| 2006/0212439 | A1 * | 9/2006 | Field ................................ 707/4 |
| 2007/0043824 | A1 * | 2/2007 | Fremantle ..................... 709/214 |
| 2007/0124415 | A1 | 5/2007 | Lev-Ran et al. |
| 2007/0250674 | A1 * | 10/2007 | Fineberg et al. .............. 711/162 |
| 2007/0266059 | A1 * | 11/2007 | Kitamura ...................... 707/204 |
| 2008/0034021 | A1 * | 2/2008 | De Spiegeleer ............... 707/204 |
| 2008/0077630 | A1 | 3/2008 | Keith |
| 2008/0243879 | A1 * | 10/2008 | Gokhale et al. ............... 707/100 |
| 2008/0256143 | A1 * | 10/2008 | Reddy et al. .................. 707/204 |
| 2009/0132571 | A1 * | 5/2009 | Manasse et al. .............. 707/102 |
| 2009/0228484 | A1 * | 9/2009 | Reddy et al. ..................... 707/6 |

FOREIGN PATENT DOCUMENTS

WO        2006/083958  A2      8/2006

OTHER PUBLICATIONS

Patent Cooperation Traty (PCT) International Search Report from co-pending PCT International Application No. PCT/US2009/039801, (International Filing Date: Apr. 7, 2009) having a mailing date of Nov. 18, 2009.

* cited by examiner

*Primary Examiner* — Thomas Dailey

(57) ABSTRACT

In accordance with some embodiments, of the systems and methods described here a data storage system that may include data de-duplication may receive a stream of data and parse the stream of data into a block at a local client node. Additionally, in some embodiments, a code that represents the block of data might be determined at the local client node. This code, representing the block of data, may be sent to a server. In accordance with various embodiments, the server may determine if a block is unique, for example, based on the code received at the server. In various embodiments, the server might write a unique block to a file at the local client node; and update metadata.

11 Claims, 4 Drawing Sheets

METHODS AND SYSTEMS FOR IMPROVED THROUGHPUT PERFORMANCE IN A DISTRIBUTED DATA DE-DUPLICATION ENVIRONMENT

FIELD OF THE INVENTION

The present invention relates generally to data processing systems, and more particularly, some embodiments relate to methods and systems for performing data de-duplication.

BACKGROUND OF THE INVENTION

Vast amounts of electronic information are stored, communicated, and manipulated by modern computer systems. Much of this vast amount of electronic information is duplicated. For example, duplicate or near duplicate copies of data may be stored on a hard drive or hard drives, communicated across a communication channel, or processed using a computer or other electronic device. This duplicated data might be used in many different applications and on many different electronic systems. Accordingly, data de-duplication technology may impact a broad range of applications.

Data de-duplication is a method of reducing or eliminating redundant files, blocks of data, etc. In this way, a data de-duplication system attempts to ensure that only unique data is stored, transmitted, processed, etc. Data de-duplication is also sometimes referred to as capacity optimized protection. Additionally, data de-duplication may address rapidly growing capacity needs by reducing electronic information storage capacity required, transmission capacity, processor capacity, etc.

In one example of how duplicate data might exist on a computer network, an employee may email a Word® attachment to 25 co-workers. On some systems, a copy is saved for every employee the file was sent to, increasing the capacity requirement of the file by a factor of 25. In some cases data de-duplication technology may eliminate the redundant files, replacing them with "pointers" to the original data after it has been confirmed that all copies are identical. This example illustrates data de-duplication at the file level. Data de-duplication may also be implemented based on variable size blocks of data. In other words, redundant variable sized blocks of data may be eliminated by replacing these blocks with a pointer to another instance of a matching block of data.

In some cases, data duplication might occur in a data storage system. For example, archived electronic information such as electronic documents, files, programs, etc. exist on backup tapes, backup hard drives, and other media. In many cases a computer may store a large number of files, which in some cases may be duplicates of the same file or document, slightly differing versions of the same document, etc. Accordingly, duplicates or near duplicates might exist for many different types of files, including documents, graphic files, and just about any other type of computer file.

Additionally, duplication might occur when data is communicated. In computer-based systems it is common for a computer to transmit one or more files over a computer network or other communication system to, for example, other computers in the computer network. This network may be wired, wireless, or some combination of the two. Additionally, the network may use just about any computer data communication system to transmit the data.

Different types of duplication might exist. In one type, a file or files may be repeatedly transmitted by a computer. For example, it is common for data transmitted during a backup operation to be almost identical to the data transmitted during the previous backup operation. Accordingly, a computer, computer networks, etc. might also repeatedly communicate the same or similar data.

In another type of duplication, a duplicate or near duplicate file or files, such as duplicate or near duplicate document, graphic files, etc. might be stored on a computer system. In other words, multiple copies of a file might exist, as in the emailed document example. Accordingly, different types of file de-duplication systems and methods might address various types of duplication. Some types of data de-duplication systems and methods might relate to file duplication or near duplication that involves multiple copies of the same or similar files sent during the same transmission. Other types of data de-duplication systems and methods may relate to file duplication that involves the same or similar files sent during a series of transmissions. Yet other types of data de-duplication might relate to both types of file duplication or near duplication.

Data de-duplication might include both transmission for backup and the backup itself. For example, some data de-duplication systems may transmit only data that has changed since a previous backup. This data might be stored on a daily basis or perhaps a weekly basis. In some systems these changes in the data might be what is saved, for example, on a backup drive, disc, tape, etc. For example, a backup system might initially transmit a "full backup" for example, all files in a directory or series of directories, all files on a disc or on a computer, all files on all disks on an entire network, etc. The full backup might simply be any files that a particular user selects for backup. The data for the full backup may be transmitted and stored using various communication and storage systems. After the full backup, subsequent backups might be based on only files that have changed. These might be the only files subsequently transmitted, stored or both. Of course, a user might also select to do a full backup from time to time after the initial full backup.

Systems that only make full backups might be required to store a large amount of data. This may increase the expenses associated with these types of systems due to, for example, the cost of additional hard drives, tape media, data CD's or DVD's, wear on disc drives, CD or DVD drives, tape drives, etc. Accordingly, incremental systems might be more efficient in terms of data storage, mechanical wear on system components, etc.

There are two main types of de-duplication. These methods are inline or offline. Inline de-duplication is performed by a device in the data path. This may reduce the disk capacity required to store electronic data thereby increasing cost savings. A disadvantage of inline de-duplication is that the data is processed while it is being transmitted for backup, which may slow down the backup process.

In contrast, offline data de-duplication does not perform the data de-duplication in the data path, but instead performs the process at a target storage system. This may require more data storage capacity, such as, for example, disk capacity. Performance may, however, be improved by having the process reside outside of the data path, after the backup job is complete. In other words, because the data is processed after being transmitted for backup it generally will not slow the transmission of data down.

Some data de-duplication systems use a client-server architecture whereby the clients parse and hash the incoming data stream. For example, some systems break data into sub-file sized chunks, sometimes referred to as "blocklets." These systems may, for example, then send unique data blocklets to the server. Generally, in these systems, redundant blocklets are not sent to the server. The server aggregates the data into larger data structures that may then be written out from the server to disk storage as files.

These systems, however, generally require that each client send data, for example, the unique data blocklets, via a network connection to the server. After the data is sent, the server performs all data I/O to, for example, the disk storage. This creates an undesirable performance bottleneck, as all data is sent via a limited network interface from the client nodes to the one node within the cluster where the server resides. A node is part of a cluster of servers, for example, a server, computers, etc. In turn the server performs data I/O only through the limited interfaces available on that single node to the disk storage.

Even in systems where each node has direct access to shared storage, the data is sent through the server so that the data index may be maintained. By maintaining the data index at a centralized location, such as, the server, each node may access the index and determine what is available on the shared storage.

In some cases, even if the internal network bandwidth can be increased cost-effectively, the server performing I/O will be constrained to the resources of a single node. Additionally, in such systems bandwidth to the overall shared disk storage may be limited.

BRIEF SUMMARY OF THE INVENTION

The present invention is directed toward methods and systems for data de-duplication. More particularly, in various embodiments, the present invention provides systems and methods for distributed data de-duplication. In accordance with some embodiments of the systems and methods described herein, a data storage system that may include data de-duplication may receive a stream of data and parse the stream of data into a block at a local client node. Additionally, in some embodiments, a code that represents the block of data might be determined at the local client node. This code, representing the block of data, may be sent to a server. In accordance with various embodiments, the server may determine if a block is unique, for example, based on the code received at the server. In various embodiments, the server might update metadata. In some embodiments, the client node may write a unique block to a storage device.

In accordance with various embodiments, the code might comprise a hash or cyclic redundancy code (CRC). In some embodiments, the code might be sent from the local client node to the server over a local area network and the server may notify the client node if a block is unique. The notification might be sent from the server to the local client over a local area network.

In accordance with some embodiments, writing a unique block to a file from the local client may comprise writing to a cluster file or writing directly to a local file system client. In some embodiments, the local file system client may write to a disk drive, tape drive, memory storage device, or other data storage device and the server might control any binary large object, hash index and cluster index or resolve any file access. In various embodiments, the local client node may provide that data block to a system requesting access.

Other features and aspects of the invention will become apparent from the following detailed description, taken in conjunction with the accompanying drawings, which illustrate, by way of example, the features in accordance with embodiments, of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DESCRIPTION OF THE PREFERRED EMBODIMENTS

Various embodiments of the systems and methods described herein provide distributed data de-duplication functionality. Distributed data de-duplication systems may divide a stream of data into data sets or blocks. In other words, the data may be parsed into multiple blocks. In some embodiments, a code that represents a block of data may be determined at a local client node and sent to a server. The server may then determine if a block is unique. For example, in various embodiments, if the server has not previously received a particular code then the block associated with that code is unique. When a block is unique, a local client node may write the block to a file from the local client node. By performing some processing and storage of data blocks at the local client nodes, functionality may be offloaded from the server. This may allow the server to perform other functions, for example, the server might update metadata.

Figure 1:
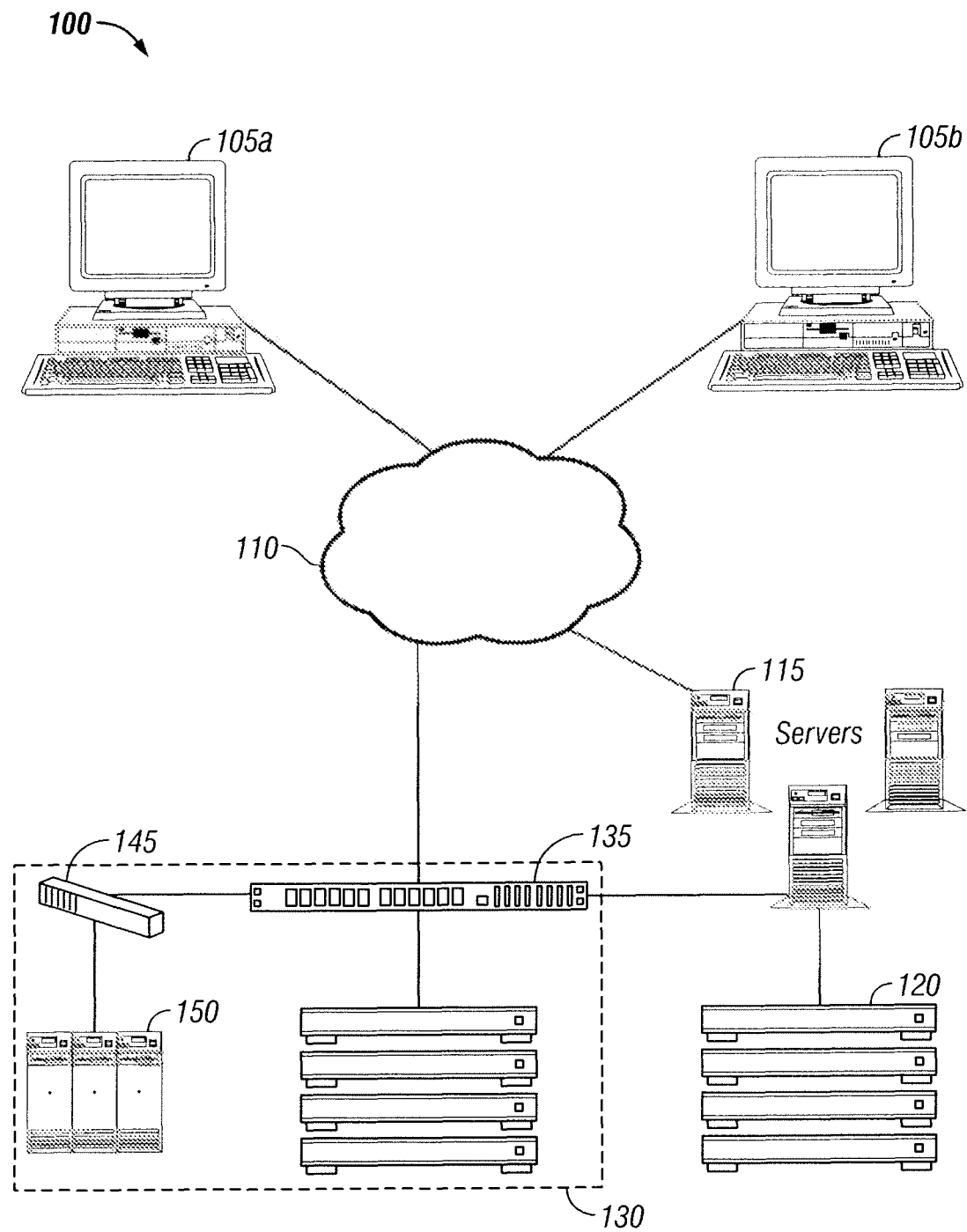
FIG. 1 is a block diagram illustrating one possible configuration of a network that can serve as an example environment in which the present invention can be implemented.

Before describing the invention in detail, it is useful to describe an example environment with which the invention can be implemented. FIG. 1 illustrates a data storage system 100 with which the present invention can be implemented. System 100 in the illustrated example includes computing devices 105*a-b*, a network 110, a server 115, an array of storage disks 120, and a storage area network 130. Computing devices 105*a-b* can be any of a variety of computing devices including, for example, laptops, desktops, workstations, personal digital assistants (PDAs), handheld computing devices, or other types of computing devices.

Network 110 can be implemented using any of a variety of network architectures or topologies. Such networks might include, for example, the internet, a local area network (LAN), a wide area network (WAN), a plain old telephone system (POTS), or any other suitable network or communications channel. In the illustrated example, computing devices 105a-b and server 115 are connected to network 110. The connection to network 110 can be wireless or through a wired connection.

Server 115 can be any server system such as, for example, a conventional standalone file server configured to provide data services to a client device such as device 105a. Server 115 can be scalable to increase storage capacity such as, for example, by adding storage disk array 120. Disk array 120 can be implemented as, for example, a direct-attached storage (DAS system). In the example architecture illustrated in FIG. 1, system 100 includes a storage pool 130, which includes switch 135, disk array 140, router 145, and a tape server 150. Server 115, disk array 120, and the storage pool 130 can be implemented using one or more types of storage architectures such as, for example, small computer system interface (SCSI), serial advanced technology attachment (SATA), serial attached SCSI (SAS), or fiber channel (FC).

Generally, a legacy SCSI system with an 8-bit wide bus can typically deliver data at a rate of approximately 40 megabytes per second ("MBps"), whereas contemporary 16-bit wide bus SCSI systems can deliver data up to 320 MBps. Typical SATA systems are generally less expensive than an equivalent SCSI system and can provide performance close to that of the 16-bit wide bus SCSI system at 300 MBps.

FC systems offer several advantages such as pooled resources, flexible backup capability, scalability, fast data transfer (up to 800 MBps full-duplex 4 Gbit link), and the ability to accommodate long cable lengths. FC systems may have cable lengths up to 10 kilometers as compared to a maximum cable length of 25 meters for other system such as, for example, a SCSI system.

With continued reference to FIG. 1, the illustrated exemplary system 100 can provide data access and storage redundancy by storing data at multiple locations such as server 115, disk arrays 120 and 140, or tape server 150. Server 115 can be groups of remote servers; each group may be locally or remotely connected with other groups via a network similar to network 110. As shown in FIG. 1, server 115 may access data or backup data to disk array 140 or tape server 150 through network 110 or via a direct connection to switch 135. In this way, server 115 has the flexibility of accessing array 140 or tape server 150 via multiple connections and thereby avoids network bottlenecks.

In various embodiments, switch 135 is an FC data switch and tape server 150 is SCSI type server. In this embodiment, router 145 is configured to transfer data between a FC data bus of FC switch 135 and a SCSI bus of SCSI tape server 150. Although a specific architecture is described above, components of the storage pool 130 may have a different architecture or combination of architectures such as, for example, SATA, SAS, and FC.

In system 100, data redundancy can be implemented in the storage pool 130 by implementing a Redundant Array of Independent Disks (RAID) across disk array 140. Parity data needed for reconstructing a failed data sector can be distributed by a RAID controller (not shown) located in the storage pool 130, across array 140, or separately to tape server 150, or across both array 140 and tape server 150. In this setup, clients 105a-b typically cannot access data stored within the storage pool 130 network when a critical component (e.g., motherboard, switch 135, power supply, etc.) of node 130 fails.

From time to time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2:
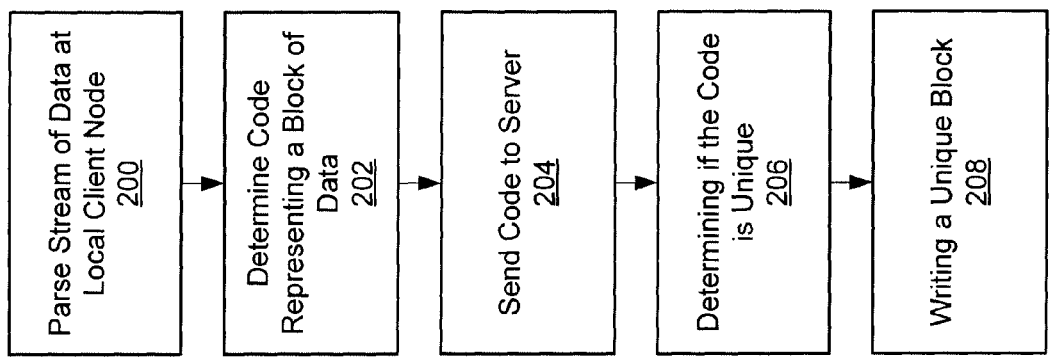
FIG. 2 is a flowchart illustrating an example method in accordance with various embodiments of the systems and methods described herein.

FIG. 2 is a flowchart illustrating an example method in accordance with various embodiments of the systems and methods described herein. Referring to FIG. 2, an example method of performing distributed data de-duplication is discussed. In accordance with some embodiments of the systems and methods described herein, a data storage system that may include data de-duplication may receive a stream of data. For example, data may enter a node via virtual device presentation. Virtual devices may be part of a storage area network (SAN) discussed below. In a step 200, a local client node might parse the stream of data into a block or blocks. For example, in some embodiments, data might be sent to a local Blocklet File Store (BFST) Client. The parsing and hashing might be done on this local node. In some examples, the term "blocklets" may refer to blocks that a data stream is broken into for data de-duplication. "Blocklets" might also describe systems within a data de-duplication system. For example, a blocklet client may be a used in place of BFST Client.

In step 202, a code that represents the block(s) of data might be determined at the local client node. In accordance with various embodiments, the code might comprise a hash, address, cyclic redundancy code (CRC), or other code that might represent a block. A hash or hash function is a reproducible method of turning one block of data into a number that represents that block of data. The hash or other code is generally smaller than the original block of data. Accordingly, the hash or other code might serve as a digital "fingerprint" of the block of data. A CRC is a type of hash function that may be used to produce a checksum to detect errors in transmission or storage.

In a step 204, this code, representing the block(s) of data, may be sent to a server. In some embodiments, the code might be sent from the local client node to the server over a local area network and the server may notify the client node if the block or blocks are unique. The notification might be sent from the server to the local client over a local area network. For example, in some embodiments, hashes may be sent to a BFST server on master node sent on an internal LAN.

In a step 206, the server may determine if a block is unique. This determination may be made based on the code received at the server. By comparing the code to previously received codes the server can determine if a block is unique. Because a code is generated based on the data block, it has a degree of uniqueness. Generally, if a code representing one block matches a code representing another block, then the blocks also match.

After the server determines that a block is unique, it may notify the local client node that generated and sent the unique block. For example, in some embodiments, the BFST server may determine which blocklets are unique and notify the BFST client of the unique blocklets via an internal LAN. Generally, in a data de-duplication system, if a block is unique, it is stored and blocks that are not unique are not stored. In some embodiments, however, there may be some amount of data storage redundancy. For example, some systems might store two copies of each redundant block instead of one. This might be done so that, if one of the copies is damaged, the other copy might be retrieved. For example, if one of the copies is damaged because of damage to a disk drive, the other copy might be retrieved from another part of the disk drive, another disk drive, etc. Additionally, in various embodiments, the server might update metadata.

In a step 208, the client node writes a unique block to a storage device. The code for this block may continue to be stored at the server for future comparisons. In some embodiments, the code might also be stored on the local client so that comparisons might be performed locally. If it is determined that a block is not unique, for example, because an identical code is stored at the server, then a place holder representing the block might be written to the storage device. The place holder representing the block may be the code, an address or some other unique or probabilistically unique identifier.

In accordance with some embodiments, writing a unique block to a file at the local client may comprise writing to a cluster file or writing directly to a local file system client. In some embodiments, the local file system client may write to a disk drive, tape drive, memory storage device, or other data storage device and the server might control any binary large object, hash index and cluster index or resolve any file access. In various embodiments, the local client node may provide that data block to a system requesting access.

For example, in various embodiments, the BFST client may write blocklets to a cluster file local to a node. The writes may occur directly to a local file system client. The file system may then write the blocklets to disk. Accordingly, in some embodiments, no data transfer will occur on the LAN from the local BFST client to the BFST server because disk I/O may be distributed across nodes. In various embodiments, for example, disk I/O may be performed directly from a node to the storage.

Some embodiments might use a Storage Area Network (SAN) file system, such as, for example, the StorNext® file system from Quantum Corporation. A SAN is a high-speed network that may be used to connect computers within a single site together to form higher-order virtual storage devices and systems. In some embodiments, a SAN file system might resolve file access and provide a shared cluster namespace while the BFST server might update metadata and control the binary large object (BLOB), the hash index and the cluster index. The BLOB is a sequence of zero or more bytes.

U.S. Pat. No. 5,990,810 to Williams, incorporated herein by reference in its entirety, provides systems and methods for partitioning blocks of data into subblocks for storing and communicating. Various systems and methods described in the Williams patent might be used in conjunction with the systems and methods described herein.

Figure 3:
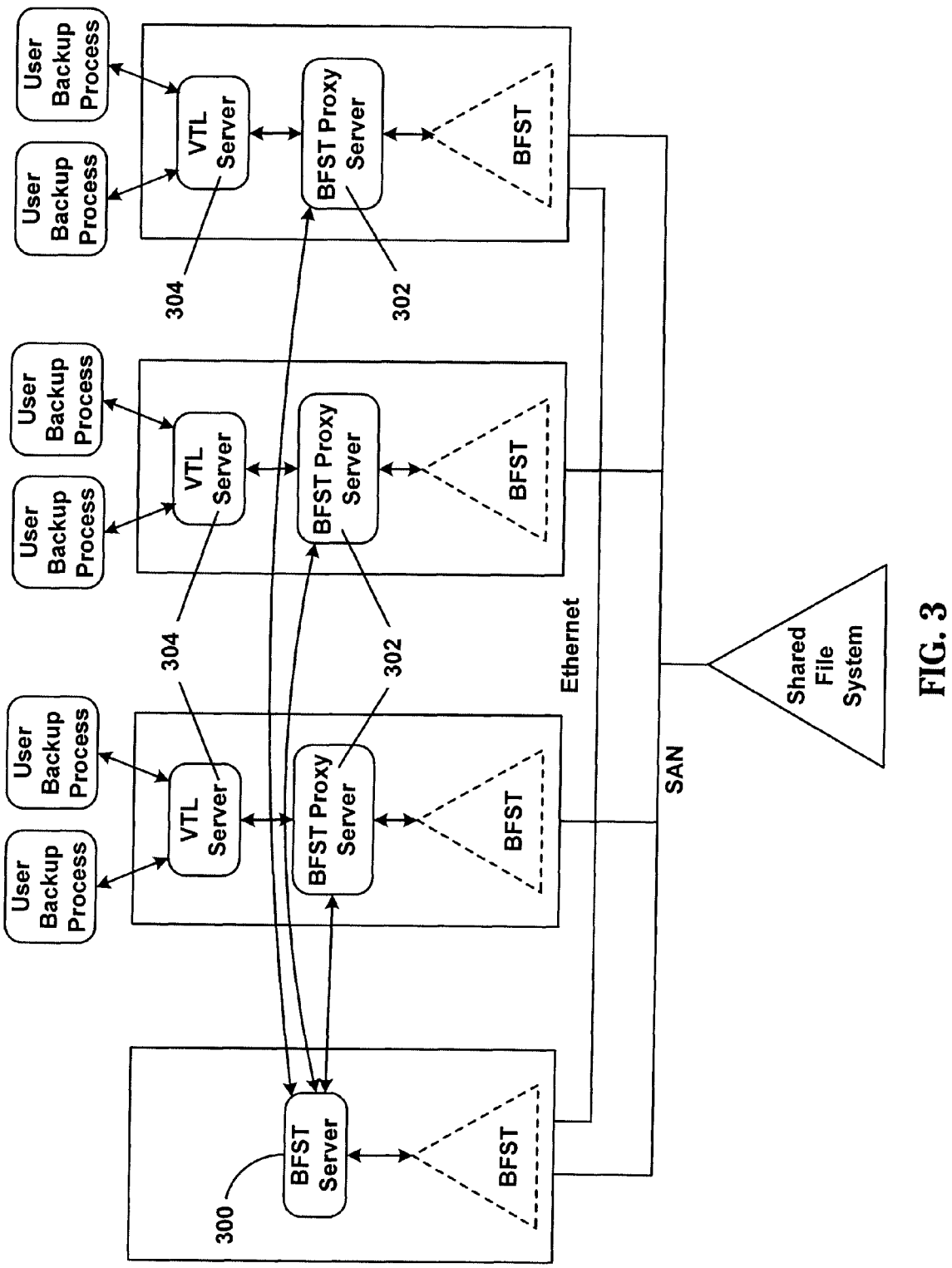
FIG. 3 is a diagram illustrating an example system in accordance with various embodiments of the systems and methods described herein.

FIG. 3 is a diagram illustrating an example system in accordance with various embodiments of the systems and methods described herein. Referring now to FIG. 3, an example system for performing distributed data de-duplication is discussed. FIG. 3 illustrates an implementation that uses BFST proxy servers. For example, in some embodiments, a single BFST with Direct Cluster I/O might be used.

In various embodiments, some example architectures may remove part of the load from the BFST server 300 by removing some or all of the data load from it. In such systems, the BFST server 300 might coordinate and store metadata. Additionally, in some embodiments, the computers may use a StorNext® to share a single file system in which there is a single BFST server. There may be a single BFST server 300 on a distinguished node. Instead of sending the binary large objects directly through the Ethernet or the SAN to the BFST server, however, the virtual tape library (VTL) servers 304 may communicate with BFST Proxy Servers 302, as illustrated in FIG. 3. While FIG. 3 illustrates an example including a VTL, it will be understood that the systems and methods described herein might be applied to other data storage systems, such as Network Attached Storage (NAS).

When one of the proxy servers 302 receives a binary large object, it may parse it into blocklets and then hash the blocklet (s). It may then connect to the central BFST server 300 and determine which of the blocklets in the binary large object are already stored at the BFST. In various embodiments, the BFST server 300 may perform all the actions that may be used to store the binary large object with the exception of, for example, the writing of the new unique blocklets to the clusters. Instead, it may instruct the proxy to perform the write on its behalf. Accordingly, the binary large object travels through the SAN rather than the Ethernet. This may improve performance over the co-located solution because the BFST server 300 does not bear the full I/O load, only the metadata load. The other nodes may perform the cluster I/O for the BFST server 300.

Figure 4:
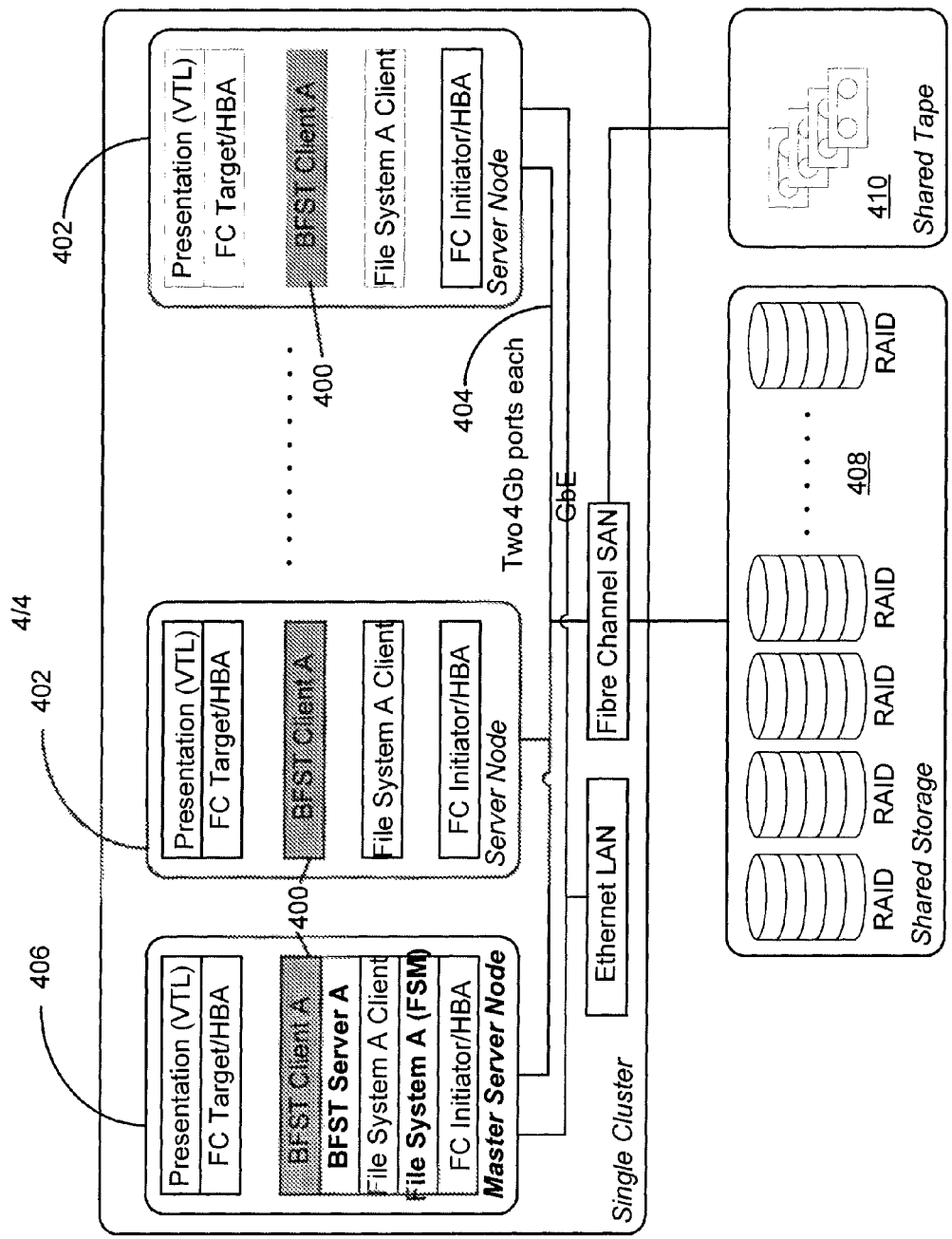
FIG. 4 is a diagram illustrating another example system in accordance with various embodiments of the systems and methods described herein.

FIG. 4 is a diagram illustrating another example system in accordance with various embodiments of the systems and methods described herein. Referring now to FIG. 4, an example system for performing distributed data de-duplication is discussed.

As discussed above, if the Blocklets' clients 400 can write the unique blocklet data locally on their nodes 402 instead of sending it over the internal network 404 to the server node 406, an internal network bottleneck can be avoided and the single server bottleneck can be improved. Some embodiments might implement such a system using a cluster or SAN file system (e.g., StorNext®). Such a file system can provide local file system access at each node within the cluster, which in turn provides direct access to the shared cluster storage. Further, such a file system provides appropriate shared access control. For example, the file system might provide file locking control.

The Blocklets client-server protocol may be modified such that, instead of the clients 402 sending the unique blocklets to the server 406, the server 406 notifies the clients as to which blocklets are unique, and the clients perform their own I/O via the local file system. For example, in some embodiments, the local file systems may be provided by a cluster or SAN file system. In this fashion, the Blocklets server 406 may coordinate the process and maintain the data index, but might no longer be responsible for the majority of the data I/O. In some embodiments, the server 406 might still do updates to the data index.

Various types of storage might be used to store the blocks of data. For example, a shared file system that might include disk drives, such as a Redundant Arrays of Independent Disks 408. Shared tape drives 410 might also be used. Other types of data storage may be used in the systems and methods described herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. In addition, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more," or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of data storage in a data de-duplication system comprising:
controlling a local client node to parse a stream of data received at the local client node into a set of variable length blocks at the local client node;
determining, at the local client node, a code that represents a block of data parsed from the stream, the code being a hash of the block;
controlling the local chant node to send the code representing the block of data to a server, where the code is sent over a network;
receiving, at the local client node, from the server, a notification that the block is unique as identified by the server in response to examining the code;
in response to receiving the notification from the server at the local client node, controlling the local client node to write the block identified as a unique block by the notification to storage associated with the local client node;
in response to receiving the notification from the server at the local client node, controlling the local client node to write the code associated with the unique block to a file at the local client node, the file being located on a storage device at the local client node, the file being configured to facilitate performing uniqueness comparisons at the local client node;
updating metadata at the server, where the metadata is associated with the existence of the unique block, the code associated with the unique block, and the location of the unique block, and
updating an index at the server with information concerning the existence of the unique block, the code associated with the unique block, and the location of the unique block.

2. The method of claim 1, where the server resolves file access and the local client node provides that data block to a system requesting access.

3. A data storage system, comprising:
a server configured to determine if a block is unique based on a code received at the server from a local client node, and to send a notification to the local client node that the block is unique, the server and the local client node being computer hardware;
the local client node being configured to:
parse the stream of data into a block at the local client node;
determine and store the code that represents the block of data;
send the code representing the block of data to the server;
write the block to a file at the local client node based on the determination that the block is unique, the file being located on a storage device at the local client node,
to selectively write the code associated with the unique block to storage associated with the local client node in response to receiving the notification at the local client node, the storage and code being configured to facilitate performing uniqueness comparisons at the local client node;
the server being configured to update metadata at the server to record the existence of the unique block, the code associated with the unique block, and the location of the unique block, and the server being configured to update an index at the server with information concerning the existence of the unique block, the code associated with the unique block, and the location of the unique block.

4. The data storage system of claim 3, the code comprising a hash.

5. The data storage system of claim 3, where the code is sent from the local client node to the server over a local area network.

6. The data storage system of claim 3, where the server is configured to notify the client node if a block is unique.

7. The data storage system of claim 3, where writing a unique block to a file at the local client comprises writing to a cluster file, the cluster file being located on a storage device on the local client node.

8. The data storage system of claim 7, where writing a unique block to a file at the local client comprises writing directly to a local file system client, the local file system client being located on the local client node.

9. The data storage system of claim 8, where the local file system client writes to a disk drive, the disk drive being located on the local client node.

10. The data storage system of claim 7, where writing a unique block to a file at the local client comprises writing directly to a storage device, the storage device being located at the local client node.

11. The data storage system of claim 3, where the server resolves file access and the local client node provides that data block to a system requesting access.

\* \* \* \* \*

UNITED STATES PATENT AND TRADEMARK OFFICE
CERTIFICATE OF CORRECTION

| | | |
|---|---|---|
| PATENT NO. | : 8,751,561 B2 | Page 1 of 1 |
| APPLICATION NO. | : 12/099698 | |
| DATED | : June 10, 2014 | |
| INVENTOR(S) | : Wideman | |

It is certified that error appears in the above-identified patent and that said Letters Patent is hereby corrected as shown below:

In the Claims:

In column 10, line 13, delete "chant" and insert --client--.

Signed and Sealed this
Twenty-third Day of December, 2014

Michelle K. Lee
*Deputy Director of the United States Patent and Trademark Office*